(12) United States Patent  (10) Patent No.: US 7,726,876 B2
Laverdiere et al.  (45) Date of Patent: Jun. 1, 2010

(54) SYSTEM AND METHOD FOR NON-INTRUSIVE THERMAL MONITOR

(75) Inventors: Marc Laverdiere, Wakefield, MA (US); Robert F. McLoughlin, Pelham, NH (US); Michael Clarke, Bedford, MA (US); Dale Maenke, Chaska, MN (US); Wiley James Wilkinson, Chanhassen, MN (US)

(73) Assignee: Entegris, Inc., Billerica, MA (US)

( * ) Notice: Subject to any disclaimer, the term of this patent is extended or adjusted under 35 U.S.C. 154(b) by 0 days.

(21) Appl. No.: 12/048,881

(22) Filed: Mar. 14, 2008

(65) Prior Publication Data

US 2008/0225925 A1 Sep. 18, 2008

Related U.S. Application Data

(60) Provisional application No. 60/906,935, filed on Mar. 14, 2007, provisional application No. 61/020,306, filed on Jan. 10, 2008, provisional application No. 61/027,330, filed on Feb. 8, 2008.

(51) Int. Cl.
*G01J 5/00* (2006.01)
*G01K 1/00* (2006.01)

(52) U.S. Cl. ............... 374/125; 374/132; 374/147; 374/208; 374/121; 374/131

(58) Field of Classification Search ........... 374/125, 374/132, 147, 208, 121, 131
See application file for complete search history.

(56) References Cited

U.S. PATENT DOCUMENTS

| | | | |
|---|---|---|---|
| 3,094,001 A * | 6/1963 | Woodcock et al. ........ | 374/123 |
| 4,037,473 A * | 7/1977 | Compton et al. ......... | 374/125 |
| 4,201,446 A | 5/1980 | Geddes et al. | |
| 4,223,226 A | 9/1980 | Quick et al. | |
| 4,251,290 A | 2/1981 | Gomez | |
| 4,257,822 A | 3/1981 | Gomez | |
| 4,295,739 A | 10/1981 | Meltz et al. | |
| 4,338,516 A | 7/1982 | Sharma et al. | |
| 4,343,960 A | 8/1982 | Eguchi et al. | |
| 4,376,890 A | 3/1983 | Engström et al. | |

(Continued)

OTHER PUBLICATIONS

International Search Report for Application No. PCT/US08/57079, filed Mar. 14, 2008.

(Continued)

*Primary Examiner*—Gail Verbitsky
*Assistant Examiner*—Mirellys Jagan
(74) *Attorney, Agent, or Firm*—Sprinkle IP Law Group

(57) ABSTRACT

Embodiments disclosed herein provide a non-intrusive thermal (NIT) monitor for sensing temperatures useful for semiconductor manufacturing applications. In some embodiments, a NIT monitor comprises a thermopile, a fluid housing with a fluid window, and an elongated member positioned between the thermopile and the fluid window for transmitting or reflecting infrared signals corresponding to a temperature of a fluid in the fluid housing. The fluid housing may have a cross-sectional profile to enable the manipulation of the fluid flow under the fluid window, enhancing the speed and accuracy of the temperature sampling. The elongated member, which may be hollow and coated with gold, may an extended piece of the fluid housing or a part of an optics housing. In some embodiments, the NIT monitor is connected to a main conditioning circuit board via a cable for processing the temperature measurements at a remote location.

27 Claims, 11 Drawing Sheets

U.S. PATENT DOCUMENTS

| | | | |
|---|---|---|---|
| 4,409,476 A | 10/1983 | Löfgren et al. | |
| 4,417,782 A | 11/1983 | Clarke et al. | |
| 4,444,991 A | 4/1984 | Beale | |
| 4,451,690 A | 5/1984 | Ishida | |
| 4,456,919 A | 6/1984 | Tomita et al. | |
| 4,472,594 A | 9/1984 | Ishida | |
| 4,487,206 A | 12/1984 | Aagard | |
| 4,496,210 A | 1/1985 | Ansel et al. | |
| 4,508,461 A | 4/1985 | Lambert | |
| 4,516,864 A | 5/1985 | Kim et al. | |
| 4,563,614 A | 1/1986 | Howorth | |
| 4,574,172 A | 3/1986 | Burack et al. | |
| 4,613,811 A | 9/1986 | Vaerewyck et al. | |
| 4,687,288 A | 8/1987 | Margolin et al. | |
| 4,722,612 A * | 2/1988 | Junkert et al. | 374/124 |
| 4,724,316 A | 2/1988 | Morton | |
| 4,752,141 A | 6/1988 | Sun et al. | |
| 4,783,647 A * | 11/1988 | Wood | 340/675 |
| 4,867,574 A * | 9/1989 | Jenkofsky | 374/121 |
| 4,875,373 A | 10/1989 | Twerdochlib | |
| 4,883,354 A | 11/1989 | Sun et al. | |
| 4,891,640 A | 1/1990 | Ip | |
| 4,892,381 A | 1/1990 | Glasheen | |
| 4,932,263 A | 6/1990 | Wlodarczyk | |
| 4,935,345 A | 6/1990 | Guilbeau et al. | |
| 4,936,646 A | 6/1990 | Enochs et al. | |
| 4,938,554 A | 7/1990 | Wilson et al. | |
| 4,988,212 A | 1/1991 | Sun et al. | |
| 5,020,913 A | 6/1991 | Okada et al. | |
| 5,026,984 A | 6/1991 | Gerdt | |
| 5,035,511 A | 7/1991 | Berthold | |
| 5,045,123 A | 9/1991 | Hattori et al. | |
| 5,051,590 A | 9/1991 | Kern et al. | |
| 5,051,595 A | 9/1991 | Kern et al. | |
| 5,059,543 A | 10/1991 | Wise et al. | |
| 5,086,220 A | 2/1992 | Berthold et al. | |
| 5,087,312 A | 2/1992 | Gerber et al. | |
| 5,090,818 A | 2/1992 | Kleinerman | |
| 5,100,479 A | 3/1992 | Wise et al. | |
| 5,113,070 A | 5/1992 | Smith | |
| 5,113,277 A | 5/1992 | Ozawa et al. | |
| 5,115,811 A | 5/1992 | Hartlaub et al. | |
| 5,121,993 A | 6/1992 | Carrigan et al. | |
| 5,146,083 A | 9/1992 | Zuckerwar et al. | |
| 5,196,694 A | 3/1993 | Berthold et al. | |
| 5,222,810 A | 6/1993 | Kleinerman | |
| 5,271,675 A * | 12/1993 | Fagan et al. | 374/110 |
| 5,272,516 A | 12/1993 | Ashizuka | |
| 5,288,147 A | 2/1994 | Schaefer et al. | |
| 5,295,206 A | 3/1994 | Mischenko | |
| 5,332,316 A | 7/1994 | Kleinerman | |
| 5,345,519 A | 9/1994 | Lu | |
| 5,386,729 A | 2/1995 | Reed et al. | |
| 5,396,568 A | 3/1995 | Reed et al. | |
| 5,414,507 A | 5/1995 | Herman et al. | |
| 5,416,585 A | 5/1995 | Hadeler | |
| 5,419,636 A | 5/1995 | Weiss | |
| 5,499,313 A | 3/1996 | Kleinerman | |
| 5,557,967 A | 9/1996 | Renger | |
| 5,589,094 A | 12/1996 | Bu | |
| 5,661,246 A | 8/1997 | Wanser et al. | |
| 5,668,908 A | 9/1997 | Cordova | |
| 5,689,087 A | 11/1997 | Jack | |
| 5,691,466 A * | 11/1997 | Lawrence et al. | 73/29.05 |
| 5,695,283 A | 12/1997 | Johnson | |
| 5,696,863 A | 12/1997 | Kleinerman | |
| 5,702,626 A | 12/1997 | Kim | |
| 5,733,255 A | 3/1998 | Dinh et al. | |
| 5,780,822 A | 7/1998 | Lee | |
| 5,783,152 A | 7/1998 | Nave | |
| 5,831,159 A | 11/1998 | Renger | |
| 5,844,667 A | 12/1998 | Maron | |
| 5,847,829 A | 12/1998 | Cordova | |
| 5,852,244 A | 12/1998 | Englund et al. | |
| 5,870,511 A | 2/1999 | Sawatari et al. | |
| 5,945,667 A | 8/1999 | Bohnert et al. | |
| 5,982,014 A | 11/1999 | Paige | |
| 5,990,412 A | 11/1999 | Terrell | |
| 6,013,907 A | 1/2000 | Lee | |
| 6,033,108 A | 3/2000 | Berthold et al. | |
| 6,045,259 A | 4/2000 | Djeu | |
| 6,055,252 A | 4/2000 | Zhang | |
| 6,072,922 A | 6/2000 | Albin et al. | |
| 6,141,098 A | 10/2000 | Sawatari et al. | |
| 6,203,194 B1 | 3/2001 | Beerwerth et al. | |
| 6,222,111 B1 | 4/2001 | Kern | |
| 6,226,453 B1 | 5/2001 | Yam et al. | |
| 6,269,202 B1 | 7/2001 | Lee et al. | |
| 6,270,254 B1 | 8/2001 | Berthold et al. | |
| 6,278,051 B1 | 8/2001 | Peabody | |
| 6,305,840 B1 | 10/2001 | Kim et al. | |
| 6,320,450 B1 | 11/2001 | Lee et al. | |
| 6,322,247 B1 * | 11/2001 | Bonne et al. | 374/138 |
| 6,335,478 B1 | 1/2002 | Chou et al. | |
| 6,342,667 B1 | 1/2002 | Shen et al. | |
| 6,348,650 B1 | 2/2002 | Endo et al. | |
| 6,350,056 B1 | 2/2002 | Helmig et al. | |
| 6,351,987 B1 * | 3/2002 | Winston et al. | 73/53.01 |
| 6,361,206 B1 * | 3/2002 | Bonne | 374/138 |
| 6,364,524 B1 * | 4/2002 | Markham | 374/131 |
| 6,370,310 B1 | 4/2002 | Jin et al. | |
| 6,388,186 B1 | 5/2002 | Nomura et al. | |
| 6,478,573 B1 | 11/2002 | Chian | |
| 6,511,860 B1 | 1/2003 | Boer et al. | |
| 6,513,390 B1 | 2/2003 | De La Puente et al. | |
| 6,547,435 B1 | 4/2003 | Grosswig et al. | |
| 6,552,345 B2 | 4/2003 | Asano et al. | |
| 6,557,630 B2 | 5/2003 | Harkins et al. | |
| 6,597,822 B1 | 7/2003 | Moslehi et al. | |
| 6,617,175 B1 | 9/2003 | Arno | |
| 6,647,800 B2 | 11/2003 | De La Puente et al. | |
| 6,658,182 B1 | 12/2003 | Gonthier | |
| 6,659,640 B2 | 12/2003 | Ruffa | |
| 6,677,654 B2 | 1/2004 | Kim et al. | |
| 6,697,555 B2 | 2/2004 | Risch et al. | |
| 6,698,297 B2 | 3/2004 | Gysling | |
| 6,713,833 B2 | 3/2004 | Boer et al. | |
| 6,717,044 B2 | 4/2004 | Kraus, II et al. | |
| 6,724,791 B1 | 4/2004 | Chiappetta et al. | |
| 6,726,360 B2 | 4/2004 | Singh et al. | |
| 6,734,657 B2 | 5/2004 | Bohnert et al. | |
| 6,740,806 B2 | 5/2004 | Starer et al. | |
| 6,751,367 B2 | 6/2004 | Moslehi et al. | |
| 6,777,961 B2 | 8/2004 | Hamamoto | |
| 6,788,835 B2 | 9/2004 | Moslehi et al. | |
| 6,821,795 B2 | 11/2004 | Arno | |
| 6,823,738 B1 | 11/2004 | Wlodarczyk et al. | |
| 6,856,714 B1 | 2/2005 | Jain et al. | |
| 6,886,977 B2 | 5/2005 | Kaminski et al. | |
| 6,895,132 B2 | 5/2005 | Moslehi et al. | |
| 6,898,339 B2 | 5/2005 | Shah | |
| 6,945,692 B2 | 9/2005 | Dammann | |
| 6,949,286 B2 | 9/2005 | Nakajima et al. | |
| 6,960,019 B2 | 11/2005 | Dammann | |
| 6,987,223 B2 | 1/2006 | Schneider | |
| 7,000,696 B2 | 2/2006 | Harkins | |
| 7,011,614 B2 | 3/2006 | Arno | |
| 7,048,732 B2 | 5/2006 | Ellingsen | |
| 7,099,542 B2 | 8/2006 | Ledbetter et al. | |
| 7,129,519 B2 | 10/2006 | Arno | |
| 7,155,101 B2 | 12/2006 | Shah | |
| 7,172,918 B2 | 2/2007 | Arno | |
| 7,173,221 B2 | 2/2007 | Lerner | |
| 7,196,509 B2 | 3/2007 | Teng | |

| | | |
|---|---|---|
| 7,230,961 B2 | 6/2007 | Hofmeister et al. |
| 2002/0001333 A1* | 1/2002 | Glasheen et al. ............ 374/131 |
| 2003/0048831 A1* | 3/2003 | Lemoine et al. ............ 374/135 |
| 2004/0022297 A1* | 2/2004 | Tabata et al. ................ 374/120 |
| 2005/0043630 A1 | 2/2005 | Buchert |
| 2008/0205481 A1* | 8/2008 | Faries et al. ................ 374/138 |

OTHER PUBLICATIONS

International Preliminary Report on Patentability for PCT Application No. PCT/US2008/057079, filed Mar. 14, 2008.

* cited by examiner

SYSTEM AND METHOD FOR NON-INTRUSIVE THERMAL MONITOR

RELATED APPLICATIONS

This application claims priority from U.S. Provisional Patent Application No. 60/906,935, filed Mar. 14, 2007, entitled "SYSTEM, METHOD AND APPARATUS FOR NON-INTRUSIVE TEMPERATURE SENSING OF SEMICONDUCTOR FLUID," U.S. Provisional Patent Application No. 61/020,306, filed Jan. 10, 2008, entitled "NON-INTRUSIVE THERMAL MONITOR," and U.S. Provisional Patent Application No. 61/027,330, filed Feb. 8, 2008, entitled "SYSTEM, METHOD AND APPARATUS FOR NON-INTRUSIVE TEMPERATURE SENSING OF SEMICONDUCTOR FLUID," the entire contents of which are expressly incorporated herein by reference for all purposes.

TECHNICAL FIELD

The present invention relates generally to temperature sensors and more particularly to embodiments of new and useful non-intrusive thermal monitors for monitoring fluid temperatures.

BACKGROUND OF THE RELATED ART

Temperature sensors used in semiconductor liquid applications generally have direct contact with the fluid from where the temperature measurements are taken. Conventionally, a probe is installed using a mechanical seal such as an o-ring or a standard fluid fitting to generate a radial seal with the shaft of the probe. The tip of the probe extends into the fluid path or remains in a stagnant side chamber to be able to read the temperature of the fluid.

A probe style temperature sensor may also have a thermal mass associated with it. This thermal mass generally results in a time delay. As the probe is exposed to different temperatures, the thermal mass of the probe has to equilibrate to the temperature change resulting in a slowed response time. To improve chemical compatibility, some probe style temperature sensors may be coated with a perfluoropolymer coating. However, this coating causes two critical issues for suppliers. First, the coating is permeable causing the metal probe to degrade quickly in aggressive chemical applications so the device has to be changed-out frequently. Second, the coating adds another layer of thermal mass further slowing down the responsiveness of the device.

SUMMARY

Embodiments disclosed herein provide systems, methods and apparatuses for fast and non-intrusive temperature sensing of a fluid, which may be particularly useful in semiconductor manufacturing applications with a fluid flow. In some embodiments, the non-intrusive temperature sensors can take temperature measurements in a fast and accurate manner without having any direct contact with a liquid. Moreover, embodiments disclosed herein can advantageously isolate electronic and/or optical components from the fluid, increasing the performance and lifespan of these components. In some embodiments, the electronic and/or optical components can be calibrated and/or serviced separate from a fluid housing and without having to shut down the fluid system.

In some embodiments, the non-intrusive temperature sensors utilize optical temperature measurement devices. In some embodiments, the optical temperature measurement devices are infrared (IR) temperature sensors. The utilization of an IR temperature sensor such as a thermopile addresses the response time issues, enabling embodiments to provide much shorter response times. IR temperature sensors are known to have the ability to measure the temperature in automobile manufacturing and food processing. However, no known IR temperature sensors are available specifically for semiconductor liquid applications. Embodiments disclosed herein take advantages of IR temperature sensors and provide non-intrusive solutions that can sample and monitor fluid temperatures in a manner that is particularly useful for semiconductor manufacturing applications. Embodiments disclosed herein do not have to be installed directly in the fluid path. They can be positioned near the fluid path or in a remote location. By positioning the sensor and electronics away from the fluid path, the thermal variations that the sensor and electronics are exposed to are minimized which could affect the speed and accuracy of temperature sampling. A high degree of temperature sensitivity and accuracy can thus be achieved. Higher temperature applications are also achievable using this method.

One embodiment of a non-intrusive thermal monitor comprises a thermopile and a fluid window. One embodiment of a non-intrusive thermal monitor comprises a thermopile, a fluid window, and a restrictor. In one embodiment, the fluid velocity can be increased at a sensor window location by restricting the flow path at the sensor window location. This has the advantage of avoiding measurement of just the outer boundary layer fluid temperature.

One embodiment of a temperature monitoring system may comprise signal processing electronics and a non-intrusive thermal monitor located separate from the signal processing electronics, in which the non-intrusive thermal monitor communicates with the signal processing electronics via an electrical or optical cable. The thermopile may also be remote provided that the cable is an optical cable capable of transmitting IR.

Embodiments disclosed herein include mechanical structures that improve IR signal transmission, IR signal collection, boundary layer reduction, and other advantages. In some embodiments, such mechanical structures may include an elongated member for transmitting IR energy, a sensor window, and one or more flow baffles.

One embodiment is directed to a non-intrusive thermal (NIT) monitor having a thermopile, a fluid housing with a fluid window, and an elongated member positioned between the thermopile and the fluid window for transmitting or reflecting infrared signals corresponding to a temperature of a fluid in the fluid housing. In some embodiments, a cavity of the elongated member is coated with gold. In some embodiments, the monitor includes one or more vent holes in communication with the cavity of the elongated member. In some embodiments, the fluid window is a thin section of the fluid housing or made separate from the fluid housing. In some embodiments, the fluid housing has a cross-sectional profile that affects a temperature change. In some embodiments, the cross-sectional profile of the fluid housing restricts the fluid flow in front of the fluid window to promote an improved temperature sampling of the fluid and increase the speed with which the fluid window changes temperature. In some embodiments, the cross-sectional profile of the fluid housing induces turbulence in front of the fluid window to promote an improved temperature sampling of the fluid and increase the speed with which the fluid window changes temperature. In some embodiments, the fluid window is positioned close to a central point of the fluid flow in the fluid housing. In some embodiments, the elongated member is an extended piece of the fluid housing or a part of an optics housing coupled to the fluid housing. In some embodiments, the monitor includes one or more vent holes in communication with a cavity of the elongated member. In some embodiments, the monitor includes an amplifier coupled to the thermopile for amplifying signals from the thermopile and providing the amplified signals to a remote conditioning board. In some embodiments, the thermopile and the elongated member are removable from the fluid housing where the fluid housing is plumbed into a fluid system.

One embodiment is directed to a system for non-intrusive thermal monitoring including a non-intrusive thermal (NIT) monitor having a thermopile, a fluid housing, a main conditioning circuit board for processing the temperature measurements at a location separate from the NIT monitor, and a cable connecting the NIT monitor and the main conditioning circuit board. The fluid housing may include a fluid window and an elongated member positioned between the thermopile and the fluid window for transmitting or reflecting infrared signals corresponding to a temperature of a fluid in the fluid housing, the fluid window or to a combination of the temperature of the fluid and a temperature of the fluid window to the thermopile. In some embodiments, the interior or cavity of the elongated member is coated with gold. In some embodiments, the fluid window is a thin section of the fluid housing or made separate from the fluid housing. In some embodiments, the fluid housing has a cross-sectional profile that causes an increased velocity of the fluid to be focused directly up and in front of the fluid window, wherein the increased velocity of the fluid affects a temperature change of the fluid window. In some embodiments, the cross-sectional profile of the fluid housing enables the fluid window to be positioned close to a central point of the fluid flow in the fluid housing. In some embodiments, the elongated member is an extended piece of the fluid housing or a part of an optics housing coupled to the fluid housing. In some embodiments, the NIT monitor further comprises one or more vent holes in communication with a cavity of the elongated member. In some embodiments, the NIT monitor further comprises an amplifier coupled to the thermopile for amplifying signals from the thermopile and providing the amplified signals to the main conditioning circuit board via the cable.

One embodiment is directed to a method for non-intrusive thermal (NIT) monitoring of a fluid. The method may include receiving a fluid into a fluid passage in a fluid housing having a fluid window, manipulating the fluid flow in front of the fluid window to improve temperature sampling from or through the fluid window, non-intrusively taking temperature measurements of the fluid, the fluid window, or a combination of the fluid and the fluid window and transmitting the temperature measurements to a printed circuit board for processing the temperature measurements of the fluid at a location separate from the fluid housing. In some embodiments, transmitting the temperature measurements of the fluid comprises amplifying signals from the infrared temperature sensor and providing the amplified signals to the printed circuit board via a cable. In some embodiments, the method includes using a calibration fluid housing to calibrate optical and electrical components of a NIT monitor and installing the calibrated optical and electrical components of the NIT monitor onto the fluid housing. In some embodiments, the optical and electrical components of the NIT monitor are removable from the fluid housing where the fluid housing is plumbed into a fluid system.

One embodiment is directed to a method for isolating components of a non-intrusive thermal (NIT) monitor from chemicals. The method may include forming a fluid window to serve as a first barrier between a fluid in a fluid housing and a cavity of an elongated member, wherein the fluid window is integral to the fluid housing, positioning a thermopile window on an external face of a thermopile, and placing a seal mechanism on a face of the thermopile window to serve as a second barrier between the cavity of the elongated member and electronic components of and beyond the thermopile. The elongated member is positioned between the fluid window and the thermopile window and is capable of transmitting or reflecting infrared signals to the thermopile and wherein the infrared signals correspond to a temperature of the fluid in the fluid housing. In some embodiments, the elongated member is coated with a material which is inert to chemicals contained in the fluid. In some embodiments, the thermopile window is composed of a material that is inert to chemicals contained in the fluid. In some embodiments, the elongated member is housed in an extended piece of the fluid housing and wherein the seal mechanism forms a fluid tight seal between the thermopile window and the fluid housing to prevent fluid passage between the thermopile window and the fluid housing. In some embodiments, the elongated member is housed in an optics housing and wherein the seal mechanism forms a fluid tight seal between the thermopile window and the optics housing to prevent fluid passage between the thermopile window and the optics housing. In some embodiments, the method includes providing a path for gases to move in and out of a cavity of the elongated member. In some embodiments, the method includes applying an axial load to the seal mechanism.

Embodiments of a non-intrusive thermal sensor disclosed herein have many advantages including, but not limited to, separation of fluid and signal processing electronics, flow path changes that cause turbidity at the point of measurement and reduce the boundary layer thermal error, elimination of the need to use fiber optics with a remote sensor, optimization of window thickness for fast signal response time, and great accuracy and fast response time at a reasonable cost. Some embodiments can achieve accuracy within +/−0.2 degrees C. Some embodiments can achieve response time at about 200 milliseconds or less.

Embodiments disclosed herein may have many applications. In some embodiments, a NIT monitor may be used in chemical dispense applications to provide thermal dispense profiles. In some embodiments, a NIT monitor may be used as an alarm device, such as to ensure fluid temperature does not go above or fall below preset limits. One example may be an alarm device to detect that the rate of temperature change does not exceed a set limit. In contrast, a thermocouple may not detect quick changes in temperature, such as a thermal pulse, because thermocouples would not have the ability to accurately observe sudden changes in the rate of temperature change nearly as fast as a thermopile. Embodiments disclosed herein may be coupled to other measurement devices for compensation purposes. In one embodiment, a non-intrusive thermal monitor may be coupled with a pressure sensor so that the thermopile can read the temperature sensor of the fluid (or even the environment) so that any thermal variations that could result in the pressure reading could be compensated for. In some embodiments, a NIT monitor may be used in a heat exchanger temperature control system, such that a control algorithm can be downloaded to the sensor which could drive a proportional fluid valve and regulate the process fluid's output temperature sensor. In some embodiments, a NIT monitor may be used in a fluid temperature mixing system in which fast temperature readings are necessary where hot and cold fluids can be mixed in-line to produce a stable output temperature. In some embodiments, a NIT monitor may be used in chemical mixing systems to compensate for exothermic reactions, to time exothermic reactions, and/or to control the temperature while mixing chemicals to control or prevent exothermic reactions.

Embodiments may also be used in system configurations such as a thermal mixing application to control the flow and temperature of a fluid by mixing hot and cold water in the correct proportions resulting in the programmed flow rate and temperature. Improvements to this application can be implemented with the use of the current invention. The improved response time of the sensor over conventional temperature measurement devices reduces the time required to attain a new programmed temperature. The device also improves the stability of the control because of the reduced response time. Embodiments are non-intrusive which means that it does not have to be in contact with the fluid that it is measuring. Thermocouples or Resistance Temperature Detectors (RTDs) generally require a protective coating such as Teflon to protect against corrosive chemicals but which is not a good thermal conductor. The coating adds additional time to the already slow response. Thermopiles may be used without a coating. Some embodiments disclosed herein may be configured as a probe style device for fluid bath applications or sealing into an existing housing or fitting.

These, and other, aspects will be better appreciated and understood when considered in conjunction with the following description and the accompanying drawings. The following description, while indicating various embodiments and numerous specific details thereof, is given by way of illustration and not of limitation. Many substitutions, modifications, additions or rearrangements may be made within the scope of the disclosure, and the disclosure includes all such substitutions, modifications, additions or rearrangements.

BRIEF DESCRIPTION OF THE DRAWINGS

Embodiments of the inventive aspects of this disclosure will be best understood with reference to the following detailed description, when read in conjunction with the accompanying drawings, in which.

DETAILED DESCRIPTION

Figure 1:
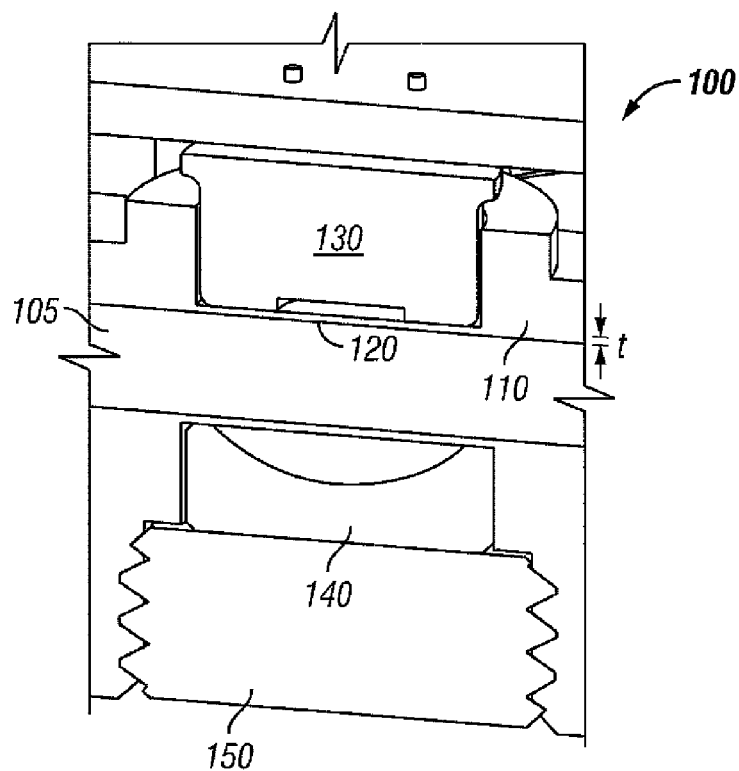
FIG. 1 depicts a cross-sectional view of one embodiment of a non-intrusive thermal monitor.

The invention and the various features and advantageous details thereof are explained more fully with reference to the non-limiting embodiments that are illustrated in the accompanying drawings and detailed in the following description. Descriptions of well known starting materials, processing techniques, components and equipment are omitted so as not to unnecessarily obscure the disclosure in detail. Skilled artisans should understand, however, that the detailed description and the specific examples, while disclosing preferred embodiments, are given by way of illustration only and not by way of limitation. Various substitutions, modifications, additions or rearrangements within the scope of the underlying inventive concept(s) will become apparent to those skilled in the art after reading this disclosure.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited to only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment," and the like.

Reference is now made in detail to the exemplary embodiments, examples of which are illustrated in the accompanying drawings. Wherever possible, the same reference numbers will be used throughout the drawings to refer to the same or like parts (elements).

Some embodiments of a non-intrusive thermal monitor may have a thermopile in close proximity to a fluid from which it acquires temperature readings. The housing around the fluid path, where the temperature sensor is located, may be hollowed out to concentrate the sensor reading on the fluid as well as isolating the temperature reading from temperature variations in the housing itself. This hollowed out area is left open as an air gap (insulation) between the housing and the fluid conduit.

Figure 2:
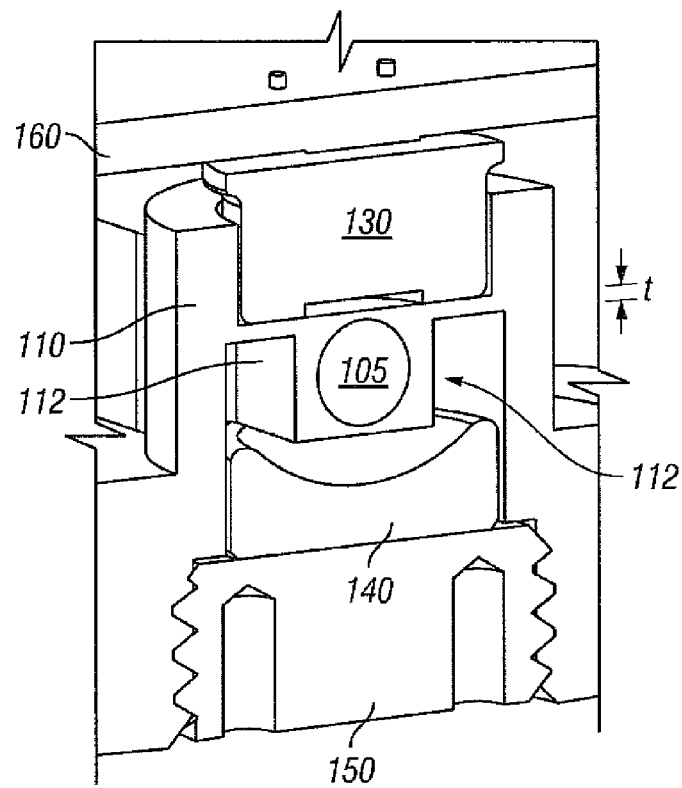
FIG. 2 depicts a cross-sectional view of one embodiment of a non-intrusive thermal monitor.

FIGS. 1 and 2 depict cross-sectional views of one embodiment of non-intrusive thermal (NIT) monitor 100. As shown in FIG. 1, a fluid may enter fluid housing 110 via passage 105, pass under fluid window 120, and exit NIT monitor 100 without contacting sensor 130. Non-intrusive thermal monitor 100 may be positioned in a fluid line for quick and accurate temperature sampling of fluid flowing in either direction through passage 105.

Sensor 130 may be separated from the fluid flowing through passage 105 by fluid window 120 such that the fluid does not contact sensor 130. Fluid window 120 may provide nearly 100% transmittance of IR energy. In some embodiments, fluid window 120 comprises a thinned section of housing 110 and sensor 130 is a thermopile useful for detecting IR energy transmitted through window 120. This provides a non-intrusive design where no additional fluid seals need to be generated for sensor 130 as is done with probe style devices. In some embodiments, it may be desirable to install window 120 manufactured from a different material from housing 110 for thermopile 130 to receive thermal energy transmitted or emitted by the fluid. Diamond, barium fluoride, and KRS-5 are some examples of materials that may be used for fluid window 120. This would require at least one fluid seal location for sensor 130 and may interfere with the flow path for the fluid.

The strength of a thin fluid window 120 is still sufficiently strong to rate the temperature sensing device for the same pressure/temperature rating of standard fitting types. For example, for a ½" and a ¾" Flaretek® fitting, the equivalent pressure rating for a given temperature value is specified per the table below:

TABLE 1

|  | ° C. | psig/(kPa) |
|---|---|---|
| ½" | 24 | 168 (1158) |
|  | 93 | 83 (572) |
|  | 121 | 52 (359) |
|  | 150 | 37 (255) |
|  | 175 | 22 (152) |
| ¾" | 24 | 107 (738) |
|  | 93 | 53 (365) |
|  | 121 | 33 (228) |
|  | 150 | 24 (165) |
|  | 175 | 14 (95.5) |

Thus, window 120 may be formed from a part of housing 110 without deformation or distortion that could affect the integrity of housing 110.

In some embodiments, reflective cup 140 may be located on the opposite side of the fluid path 105 from sensor 130. Reflective cup 140 may be designed with a concave profile to reflect the infrared light waves back through the fluid to sensor 130 at approximately the same angle the infrared light waves reached reflective cup 140. This concave profile of reflective cup 140 may be polished or cup 140 may be composed of a shiny material such as aluminum for high IR reflectivity. Reflective cup 140 may be held in place by some mechanical means such as insert 150 threaded into housing 110. Reflective cup 140 may be constrained within housing 110 by insert 150 and insulated or isolated from outside temperature variations which could affect the temperature readings of thermopile 130. Air gaps 112 (as shown in FIG. 2) may further isolate sensor 130 from outside temperature variations.

In operation, sensor 130 may detect IR energy, generate electrical signals, and send the electrical signals to conditioning board 160. Conditioning board 160 coupled to sensor 130 may receive the signals and determine a temperature of the fluid based on the signals received. In some embodiments, the main conditioning board 160 can be configured with a DB 15 high density connector which will require connections for powering the device (such as 18-24 VDC), providing an analog out signal (such as 0-5 VDC and 4-20 mA) and for a serial interface (such as RS232 and 485).

Each of the factors such as close proximity of sensor 130 to the fluid, the air gap isolation of the fluid conduit, concave reflective cup 140, and isolation insert 150 alone and in combination provide for improved accuracy benefits while maintaining the desired non-intrusive feature of a thermopile device. The flow path is also in-line with no protrusions or dead spaces typical of current flow path designs used in semiconductor liquid applications.

Figure 3:
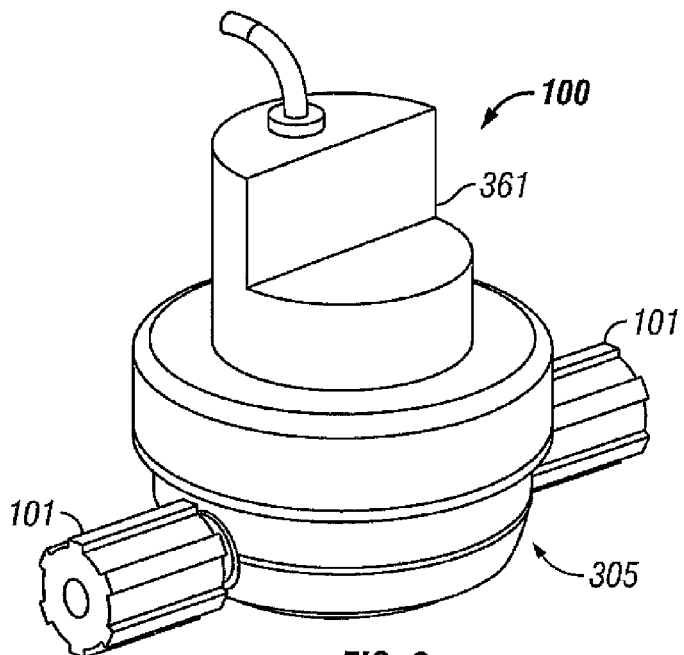
FIG. 3 depicts a perspective view of one embodiment of a non-intrusive thermal monitor.

FIG. 3 depicts a perspective view of one embodiment of non-intrusive thermal monitor 100. Non-intrusive thermal monitor 100 may have fittings 101 such that monitor 100 may be connected with common fittings, which may reduce installation removal times and avoid leaks at the connection with the system being monitored. Sensor 130 may be mounted directly to conditioning board 160 and installed into fluid housing 305 with fluid passage 105 and covered with electronics housing 361. In some embodiments, fluid housing 305 may contain sensor 130 and electronics housing 361 may contain conditioning board 160.

Figure 4:
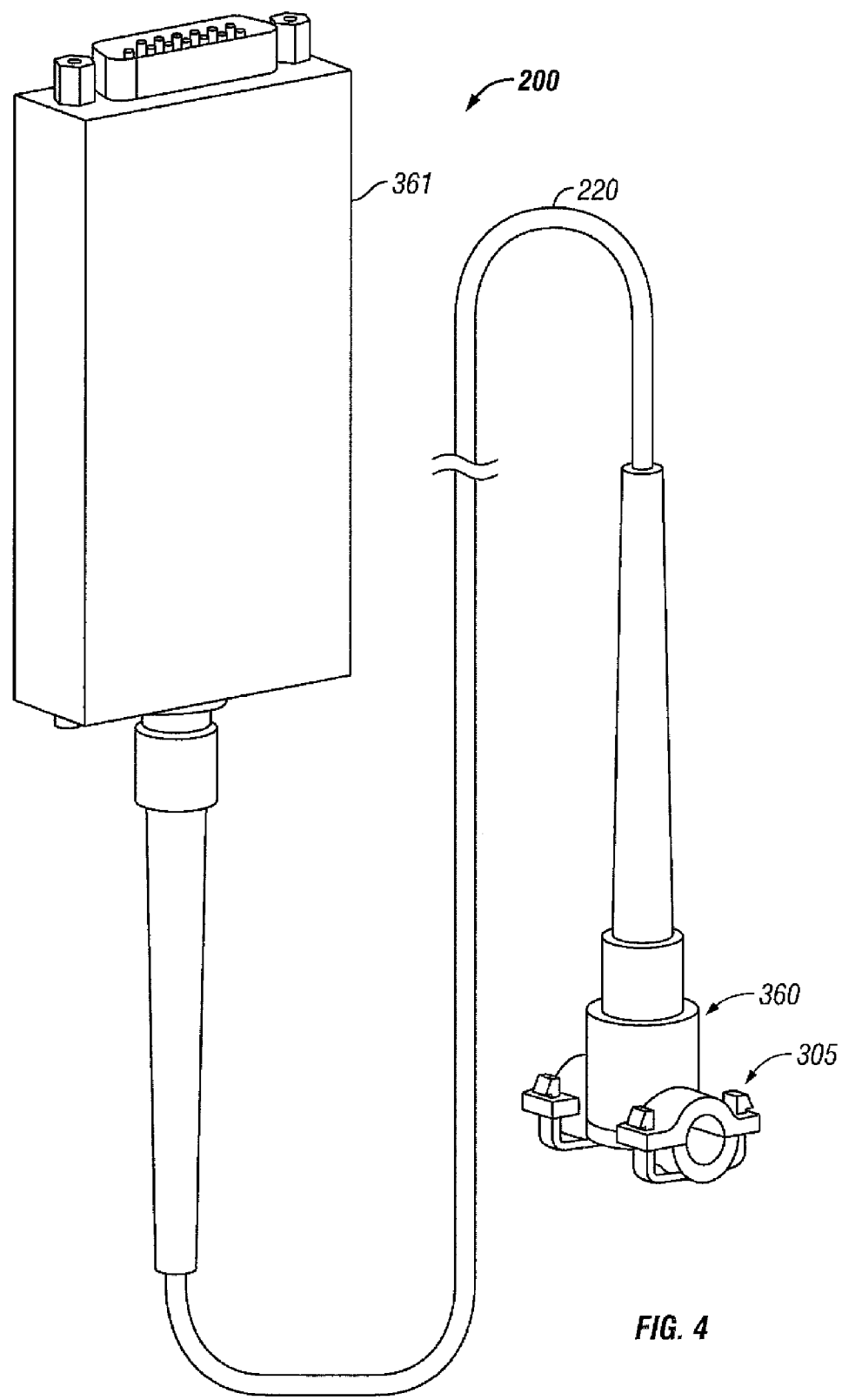
FIG. 4 depicts a perspective view of one embodiment of a non-intrusive thermal monitor.

FIG. 4 depicts one embodiment of NIT monitor 200 in which conditioning board 160 may be located remotely from sensor 130. In some embodiments, an amplification board (not shown) may receive signals from sensor 130 and amplify the signals before sending them to the conditioning board. NIT monitor 200 may include optical cable 220, enabling the temperature of a fluid to be measured remotely. A portion of the electronics, including sensor 130, are located in housing 361 away from the fluid in housing 305 and optics housing 360. In some embodiments, a main conditioning board may be connected to the amplifier board across a length of cable 220. A first end of optical cable 220 may be encased in electronics housing 361. Optical housing 360 encases the other end of optical cable 220 and can then be attached onto a fluid conduit. Optics housing 360 may be a snap-fit style housing or a clamp-fit style housing. A snap-fit housing design or clamp style design may be easy to install and remove because it does not have to get cut into the fluid line. This also eliminates two fluid fitting connections and does not interfere with the fluid path.

Figure 5:
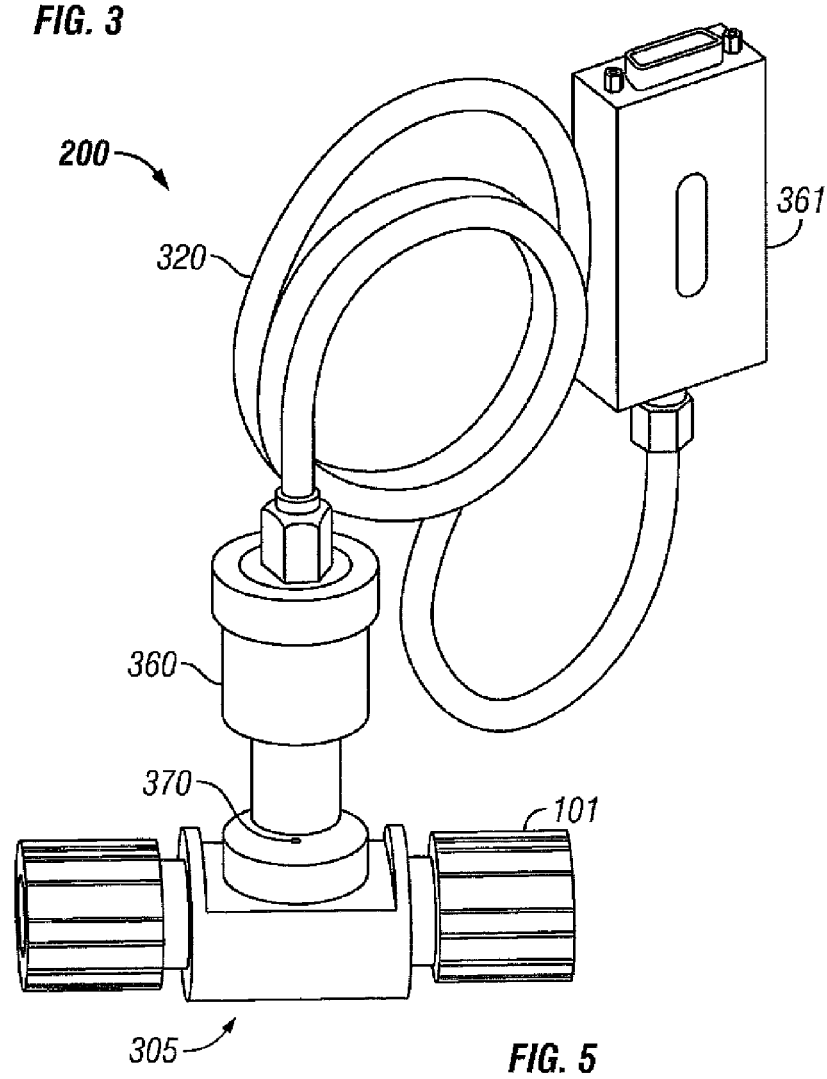
FIG. 5 depicts a perspective view of one embodiment of a non-intrusive thermal monitor.

FIG. 5 depicts one embodiment of NIT monitor 200 in which conditioning board 160 may be located remotely from sensor 130. In some embodiments, an amplification board 365 (not shown) may receive signals from sensor 130 and amplify the signals before sending them to the conditioning board. NIT monitor 200 may include electrical cable 320, enabling the temperature of a fluid to be measured remotely. A portion of the electronics, including sensor 130, are located in optics housing 360 away from the fluid in housing 305 and other electronic components in housing 361. In some embodiments, a main conditioning board may be connected to the amplifier board across a length of cable 220. A first end of electrical cable 320 may be encased in electronics housing 361. Optical housing 360 encases the other end of electrical cable 320 and can then be attached onto a fluid conduit. Fluid housing 305 may be an in-line style housing.

An advantage of isolating the conditioning board 160 from the amplifier board 365 and sensor 130 may be the reduction or elimination of the heating affects of the conditioning board 160 on the components in housing 360 (such as sensor 130 or amplifier board 365) and to reduce the package size of housings 305 and 360. Also, separating electronics (such as sensor 130 and conditioning board 160) from the fluid path prevents the electronics from heating due to elevated fluid temperatures. Therefore, even higher temperature fluids may be measured with embodiments disclosed herein. As an example, neglecting the deleterious effects of the severe temperature changes to the case of sensor 130, existing electrical components are only rated to 150° C., but fluids in semiconductor manufacturing may reach higher temps. So, spacing the electronics away from the hot fluid may be necessary for extreme temperature applications. By isolating the electronics from the fluid components, much higher fluid temperatures can be measured. In some embodiments, NIT monitor 100 (depicted in FIGS. 1-3) can handle fluid temperatures of about 80 degrees C. whereas embodiments implementing the design depicted in FIGS. 4 and 5 may measure temperature in excess of 200 degrees C.

Since chemicals and chemical vapors can permeate through a PFA or PTFE housing 305, optics housing 360 may include vent holes 370 to isolate the amplifier board or any other electronics in the optics housing from the gases. Although the permeation may be at a slow rate, it is necessary to isolate the electronics from any permeating fluids or gases as well as preventing any pressure build-up in elongated member 332, optics housing 360 or NIT monitor 200 or 300. In order to prevent pressure build-up (whether it is air pressure build-up due to temperature variations or chemical vapor pressure build-up), a means to relieve this potential pressurization may be introduced to chemically isolate sensor 130 from fluids permeating through housing 305. In this case, one or more vent holes 370 can be machined in optics housing 360 which provides a path for gases to move in and out of housing 360 to maintain an equal pressure with the external environment. In some embodiments, vent holes 370 and a pressure bias may be useful as a tool for chemically isolating the electronic components in optics housing 360. By maintaining a positive fluid (gas) pressure bias in optics housing 360, chemicals that permeate through fluid housing 305 may be forced out of optics housing 360 through vent holes 370. In some embodiments, an inert gas may be used to maintain the pressure bias. In some embodiments, nitrogen may be used to maintain the pressure bias. In some embodiments, the pressure bias is negligible.

In some embodiments, housing 361 or cable 220 or 320 can pass through a hole so that a clamp-on style bulkhead component can be placed around cable 220 or 320 and clamped around housing 205 or cable 220 or 320 so that the bulkhead isolates the metal electronic enclosure 361 from the location where the fluid components are located. Roxtec's Multidiameter™ technology provides a good example for how to isolate the fluid components and the electronic enclosure through a bulkhead. Using this technology, cable 220 or 320 may be passed through a hole in the bulkhead and a seal may be formed around cable 220 or 320 and installed so that electronics may be isolated in a cabinet, drawer, etc., but still be able to monitor the temperature of a fluid.

A reflective cup (such as reflective cup 140 depicted in FIGS. 1 and 2) or another means for concentrating the temperature reading on just the fluid can be incorporated into this design configuration as well. Similarly, optical cable 220 can also be incorporated into embodiments with the thinned wall sections, air barrier, and reflective cup (such as the embodiments depicted in FIGS. 1 and 2).

Advantageously, the cost of these devices is competitive with non-semiconductor application ready thermopile devices. As noted above, known thermopile devices are not suitable for semiconductor applications and would require alteration of the device to fit into/onto a fluid path as well as incorporation of an appropriate output signal conditioner.

Figure 6:
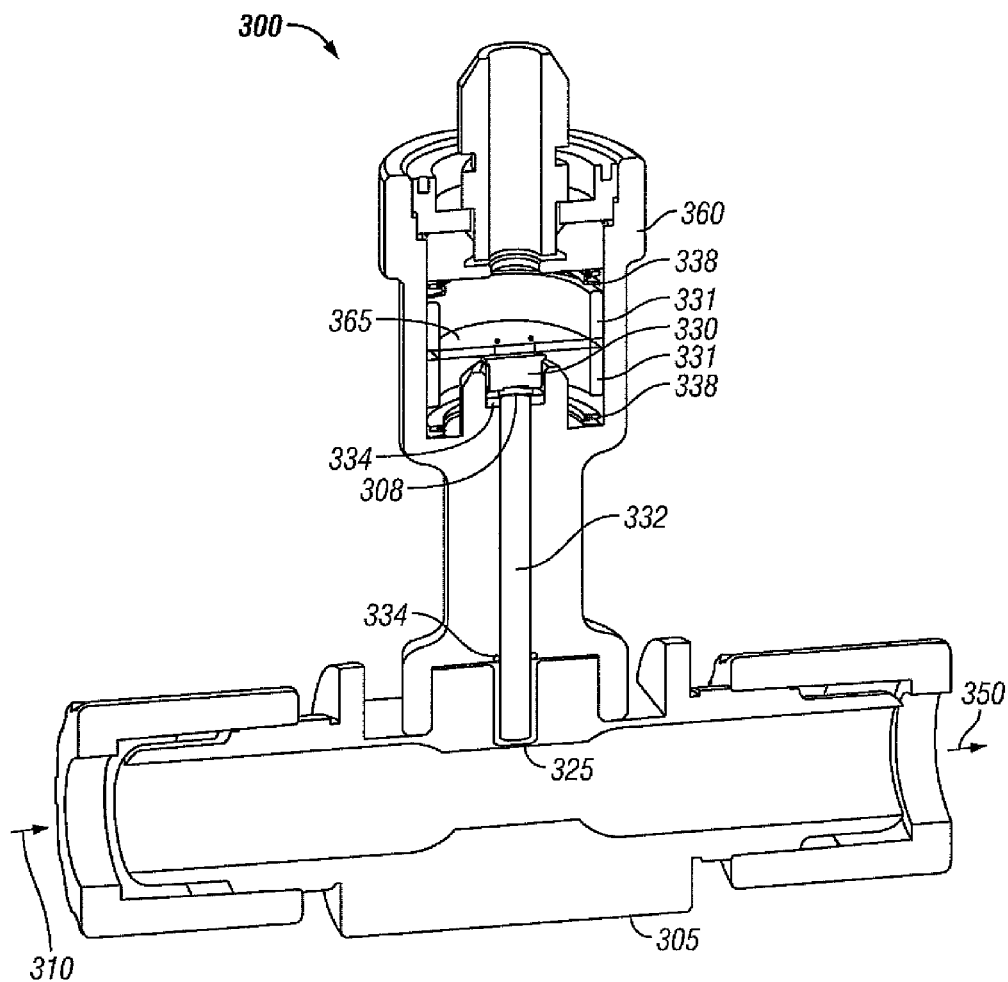
FIG. 6 depicts a cross-sectional view of a non-intrusive thermal monitor such as the embodiment depicted in FIG. 5.

FIG. 6 depicts a cross-sectional view of non-intrusive thermal monitor 300, representing a design configuration according to one embodiment. Fluid flow may enter fluid housing 305 through inlet 310, pass by fluid window 325, and exit NIT monitor 300 at outlet 350. Temperature sensor 330 located in optics housing 360 may detect the temperature of fluid passing by fluid window 325 using elongated member 332 directed at fluid window 325. Those skilled in the art will appreciate that non-intrusive thermal monitor 300 may be positioned in a fluid line such that quick and accurate temperature sampling may be obtained from fluid flowing from inlet 310 to outlet 350 or from outlet 350 to inlet 310.

Fluid window 325 of fluid housing 305 transmits the infrared (IR) energy. In some cases, because the IR transmission rate is not perfect, window 325 may emit IR energy, creating a small amount of thermal mass in the infrared reading and therefore slowing down the responsiveness of the fluid temperature reading until the temperature of fluid window 325 equilibrates with the temperature of the fluid. In some embodiments, instead of using a thin section of fluid housing 305 as window 325, a separate window material can be implemented and held in place using a gasket seal or an o-ring seal or some other sealing mechanism known in the art. The alternative window material could be a compatible material such as diamond, KRS-5, or barium fluoride, providing it is inert when in contact with the application fluid and does not change any of its physical properties that affect its transmission unless the change in the transmission properties are known and can be correlated to the fluid temperature.

Elongated member 332 may be manufactured from any material that transmits or reflects infrared (IR) signals from fluid window 325 to thermopile 330. In some embodiments, elongated member 332 may be hollow and have a coating in the cavity for reflecting IR signals. In some embodiments, the cavity of hollow elongated member 332 may be coated with gold. A gold coating may result in very accurate readings taken by sensor 330 located remotely from fluid window 325. In some embodiments, hollow elongated member 332 may be manufactured from ABS plastic. ABS plastic may provide low distortion at higher temperatures to ensure elongated member 332 reflects IR energy to sensor 330. In one embodiment, hollow elongated member 332 may be manufactured from PFA or PTFE. In other embodiments, elongated member 332 may be manufactured out of a solid material such that IR energy may be transmitted from fluid window 325 to sensor 330. In some embodiments, a solid material may be used to transmit the infrared signal from the fluid housing to thermopile 330. Examples of suitable materials may include, but are not limited to, silver halide and chalcogenide. Such materials may be used for infrared optical cables. The cross-sectional profile, length, and material may affect the transmittance of elongated member 332. In some embodiments, elongated member 332 may transmit over 94% of the IR energy. In other embodiments, elongated member 332 may transmit over 99% of the IR energy. Elongated member 332 may form part of fluid housing 305. In other embodiments, elongated member 332 may form part of optics housing 360.

It is desirable to have the end of elongated member 332 in close proximity to the actual process fluid and to the thermopile window as possible to focus as much of the IR temperature signal up elongated member 332 to the thermopile 330. It is important to note that no vertical load or minimal vertical load is placed on elongated member 332 which could potentially pierce fluid window 325. Elongated member 332 may be thin walled to minimize its thermal mass which also creates a sharper edge with the potential to damage the encasing components if not properly packaged. In some embodiments, elongated member 332 is designed such that the maximum length of elongated member 332 (due to tolerances), does not generate an interference fit between sensor 330 and fluid housing 305. In other words, there may always be a slight gap with the fit of these components.

Some embodiments may use a slight radial friction fit between elongated member 332 and optics housing 360 in order to hold elongated member 332 in housing 360, although other means such as a silicon seal applied between the two components or (an) o-ring(s) to hold elongated member 332 radially could also be implemented. Optics housing 360 may include amplifier board 365 and/or condition board 329 (not shown) and other electronic components. Amplifier board 365 and/or conditioning board 329 may receive signals from sensor 330 and perform one or more signal processing algorithms.

In some embodiments, an axial load may be applied to components in optics housing 360 by the use of wave springs 338. Other types of loading mechanisms may also be used. The wave springs 338 may absorb any tolerance variations of the assembled components and are balanced such that wave spring 338 located above amplifier board 329 will always be more compressed than wave spring 338 located below amplifier board 329. This increased compression will generate more load than when the same wave spring 338 is used above and below the amplifier board.

In some embodiments, located between amplifier board 365 and each wave spring 338 is a short section of steel tubing 331. This tubing 331 is used to position or locate amplifier board 365, to provide grounding for the amplifier board 360 degrees (Faraday cage), and to prevent RF transmission from passing through optics housing 360 to amplifier board 365. The current design method also eliminates the need for screws to hold and ground amplifier board 365 appropriately making it simplistic in design and easy to assemble.

In some embodiments, amplifier board 365 compartment is sealed from the external environment using a couple of o-ring seals (one under the optics retainer and one under the flange of the strain relief) and the gasket seal with thermopile window 323. This prevents any external chemical vapors from entering the cavity as well as any fluid which could short out the electronics. With this, the only exposed external materials of NIT monitor 300 are chemically compatible plastics (PTFE, PFA, etc.). The internal components that are unlikely to be subjected to much, if any, chemical exposure may be chemically compatible themselves. These may include elongated member 332 and sensor window 308. The material for sensor window 308 may depend on the chemical applications in which NIT monitor 300 would be used. Some examples of thermopile window materials which may be used for semi-conductor applications include KRS-5, barium fluoride, and diamond.

In some embodiments, gasket(s) 334 located on one or both ends of elongated member 332 may chemically isolate electronic components from fluids that permeate through housing 305.

NIT monitor 100, 200 and 300 may have advantages over prior art thermal monitors. Monitor 100, 200 or 300 may use a flow through design instead of a probe-style. A flow through design is non-intrusive with no fluid sealing components for the temperature sensing element itself. Another advantage is that the flow path may be manipulated to enhance the temperature signal reading and improve the response time. The thinned housing material may allow temperature readings of the fluid with little or no effect from housing 305, minimizing the response time. Also, fluid window 325 allows some transmission of infrared energy so the signal is not entirely dependant on the temperature change of the window itself (and alternate window options can provide even better IR transmission). Another advantage is that re-calibration of thermopile temperature sensor devices 300 are generally unnecessary as they are not susceptible to drift. If calibration is needed, the calibration can be performed without breaking into the fluid-line and fluid housings are interchangeable. The advantages improve serviceability where all parts of optics housing 360 can be separated from fluid housing 305 and exchanged with a new set of components if necessary. Another advantage is that the chemical compatibility of the fluid components and non-fluid components that could be exposed to chemicals at some level may be chemically compatible or inert.

Figure 7:
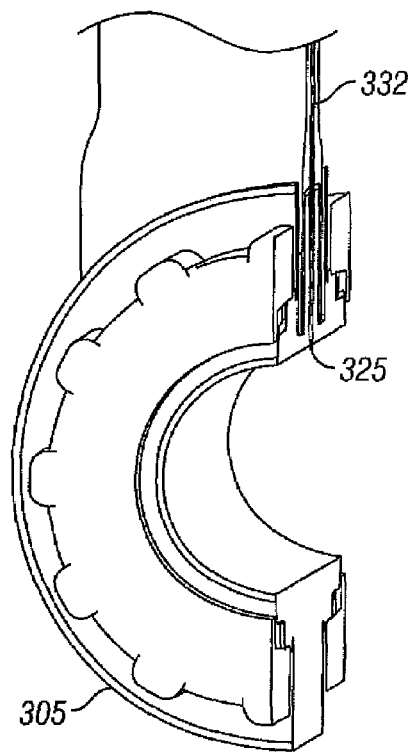
FIG. 7 depicts a cutaway view of one embodiment of a non-intrusive thermal monitor.
Figure 8:
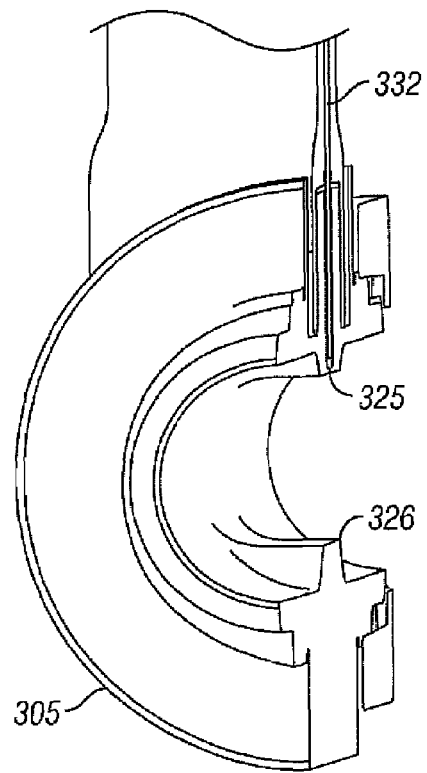
FIG. 8 depicts a cutaway view of one embodiment of a non-intrusive thermal monitor.
Figure 9B:
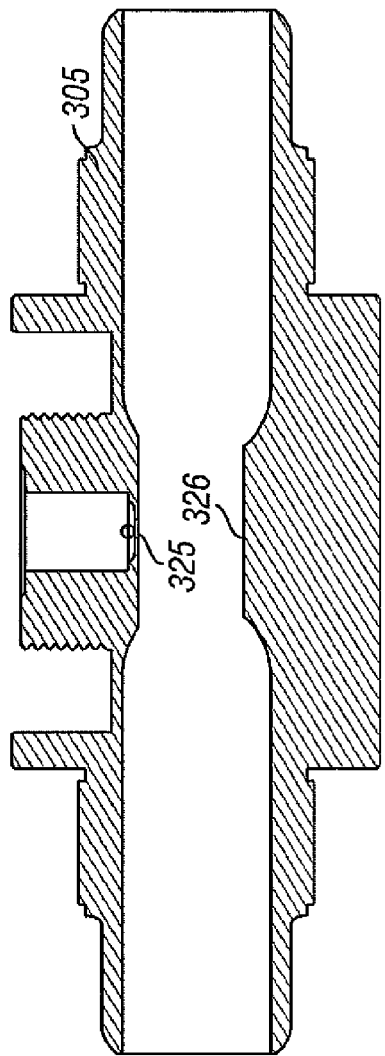
FIGS. 9A and 9B depict cross-sectional views of one embodiment of a non-intrusive thermal monitor.
Figure 9A:
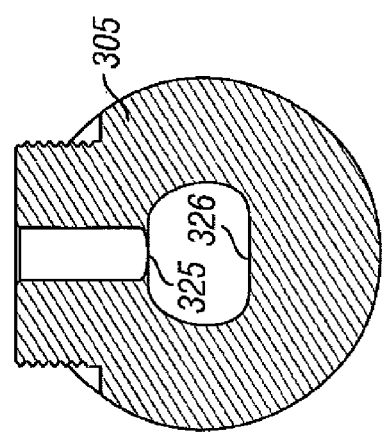

In some cases, for a perfectly round flow path, such as shown in FIG. 7, fluid window 325 may only be in contact with the outer boundary layer of the fluid, preventing a more accurate reading of the total fluid temperature passing by window 325. In some embodiments, such as shown in FIG. 8, the cross-sectional profile of the inside of fluid housing 305 may be shaped to improve temperature sampling. In some embodiments, the cross-sectional profile of the inside of fluid housing 305 may be shaped to increase the speed which the fluid window changes temperature. In some embodiments, manipulating the fluid flow may improve temperature sampling or increase the speed which the fluid window changes temperature. FIGS. 9A and 9B represent cutaway views of one embodiment of housing 305 of non-intrusive monitor 300, depicting one cross-sectional profile that may be useful for manipulating the fluid flow through housing 305. Examples of ways to manipulate the fluid flow using the cross-sectional profile of fluid passage 305 include, but are not limited to, restricting the diameter of fluid passage 305 to restrict the fluid flow, positioning baffles to decrease the boundary layer of the fluid flow or induce turbulence in the fluid flow, increasing the velocity of fluid in fluid passage 305, and changing the direction of fluid flow through fluid passage 305. For example, cross-sectional profile of fluid passage 305 may restrict the internal dimensions of passage 305 with flow bump 326 across from window 325 such that the flow of fluid past fluid window 325 is increased. Increasing the flow past thin-walled region 325 may allow NIT monitor 100 to detect temperature changes quicker, resulting in improved temperature sampling. In some embodiments, the cross-sectional profile of fluid passage 305 may position fluid window 325 closer to the central flow lines in the fluid flow.

Figure 10:
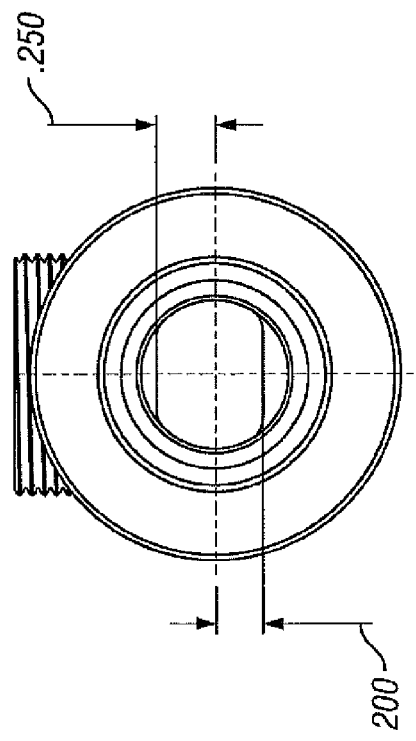
FIG. 10 depicts a schematic diagram of one embodiment of a cross-sectional profile of a non-intrusive thermal monitor.

FIG. 10 depicts a schematic diagram of one embodiment of a non-intrusive monitor 300 in which the cross-sectional profile may be selected for improved temperature sampling. In some embodiments, window 325 may be flat. In some embodiments, the fluid side of the fluid window 325 may be flat and be positioned at a first distance from the centerline and flow bump 326 on the opposite side of the flow housing 305 may be positioned closer to the centerline than fluid window 325. As an example, the fluid side of the fluid window 325 may be flat and be positioned at 0.250 inches from the centerline and flow bump 326 on the opposite side of the flow housing 305 may be positioned at 0.200 inches from the centerline. Flow bump 326 causes an increased velocity of fluid to be focused directly up in front of the fluid housing window 325. This increased fluid velocity causes fluid window 325 to change temperature more quickly and flow bump 326 changes the boundary layer profile of the fluid advantageously for a more accurate temperature measurement. By introducing a restrictor, making fluid window 325 on the ID of housing to be flat, and designing in flow bump 326 to direct the fast moving fluid to run directly across the face of the fluid housing window, a significant amount of the slow down due to the thermal mass of fluid window 325 can be eliminated.

Figure 11:
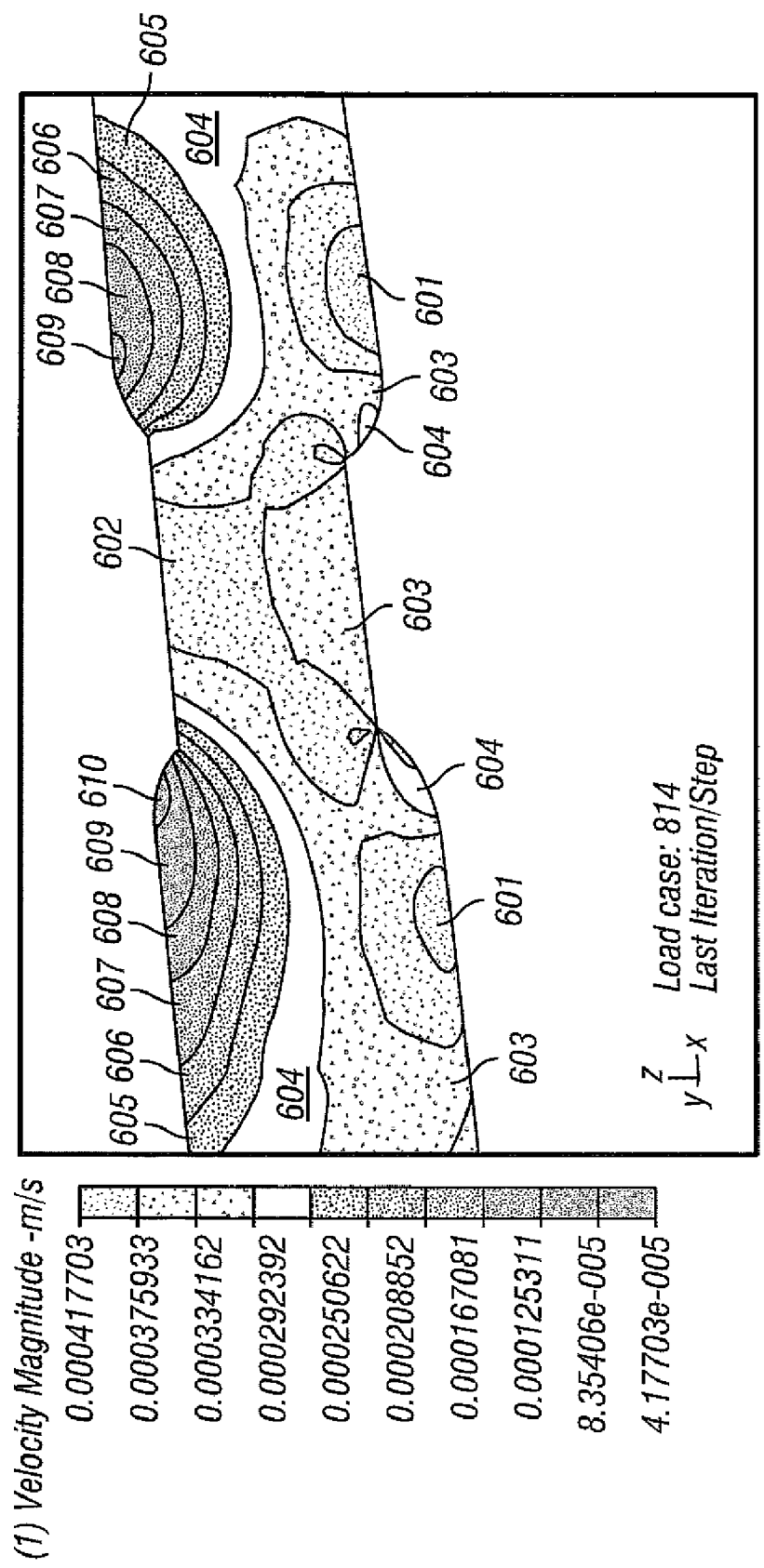
FIG. 11 depicts a graphical representation of fluid flow in one embodiment of a non-intrusive thermal monitor.

FIG. 11 depicts a graphical representation of the flow of fluid through NIT monitor 300 having fluid restrictor 320 in fluid passage 305. As depicted in FIG. 11, region 601 represents fluid flow in a first flow range (in one embodiment, 0.0000417703 m/s), region 602 represents fluid flow in a second flow range (in one embodiment, 0.0000375933 m/s), region 603 represents fluid flow in a third range (in one embodiment, 0.0000334162 m/s), region 604 represents fluid flow in a fourth flow range of (in one embodiment, 0.0000292392 m/s), region 605 represents fluid flow in a fifth flow range (in one embodiment, 0.0000208852 m/s), region 606 represents fluid flow in a sixth flow range (in one embodiment, 0.0000167081 m/s), region 607 represents fluid flow in a seventh flow range (in one embodiment, 0.0000125311 m/s), region 608 represents fluid flow in an eighth flow range (in one embodiment, 8.3406e-005 m/s), region 609 represents fluid flow in a ninth flow range (in one embodiment, 4.17703e-005 m/s), and region 610 represents a tenth flow range (in one embodiment, nearly stagnant fluid flow). By selecting a restrictor 320 of appropriate dimensions, the fluid flow may be directed such that temperature sensor 330 is monitoring a preferred region. In some embodiments, region 602 may be preferred because it represents a fluid flow having higher velocity to quickly change the temperature of window. In some embodiments, region 601 may be preferred because it may have the highest velocity. By selecting an appropriate cross-sectional profile for window 325 and flow bump 326, a preferred flow range may be selected for a preferred temperature sample.

Figure 12:
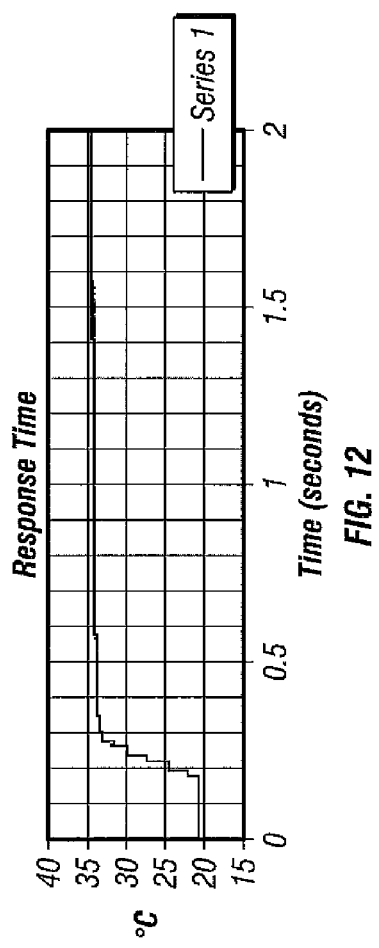
FIG. 12 depicts a graphical representation of the response time for one embodiment of a thermopile sensor.

FIG. 12 depicts a graphical representation of the thermal response time for a thermopile in contact with a human finger. As shown in FIG. 11, thermopile 130 may be able to accurately represent a change from about 20 degrees Celsius to about 35 degrees Celsius in less than 0.5 seconds, resulting in quick yet accurate measurements.

Figure 13B:
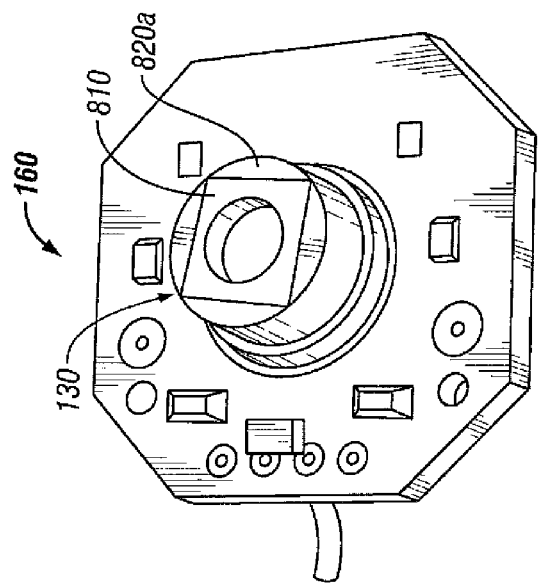
FIGS. 13A and 13B depict perspective views of two configurations for one embodiment of a thermopile sensor.
Figure 13A:
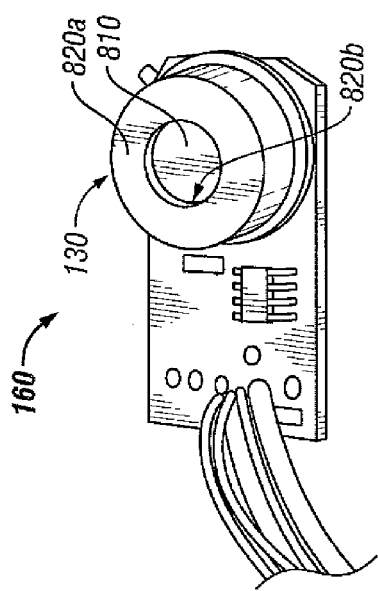

FIGS. 13A and 13B depict perspective views of two thermopiles 130 useful for detecting IR energy. In terms of the chemical vapors in the cavity of elongated members 332, in some embodiments, the thermopile may be modified to ensure that chemical vapors can not become exposed to any components/materials which are susceptible to degradation. By placing thermopile window 810 on the external face 820a of the sensor case 820 (as shown in FIG. 13B) rather than the internal face 820b of case 820 (as shown in FIG. 13A), a fluid tight seal can be generated using a face seal gasket design between the sensor window 810 and the optics housing. In some embodiments, mechanisms-(such as wave springs 338 shown in FIG. 6) may be used to impart an axial force on sensor 130 to ensure sensor window 810 does not separate from case 820 or otherwise allow chemicals to come in contact with electronic components.

Figure 14A:
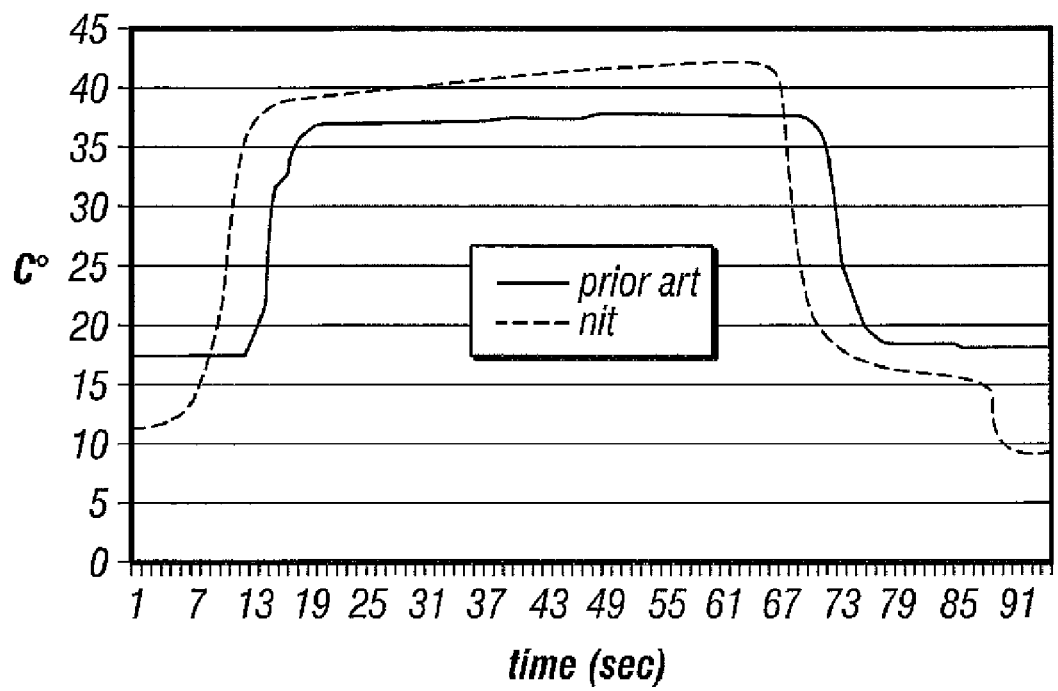
FIGS. 14A and 14B depict graphical representations of the response time for two elongated members.
Figure 14B:
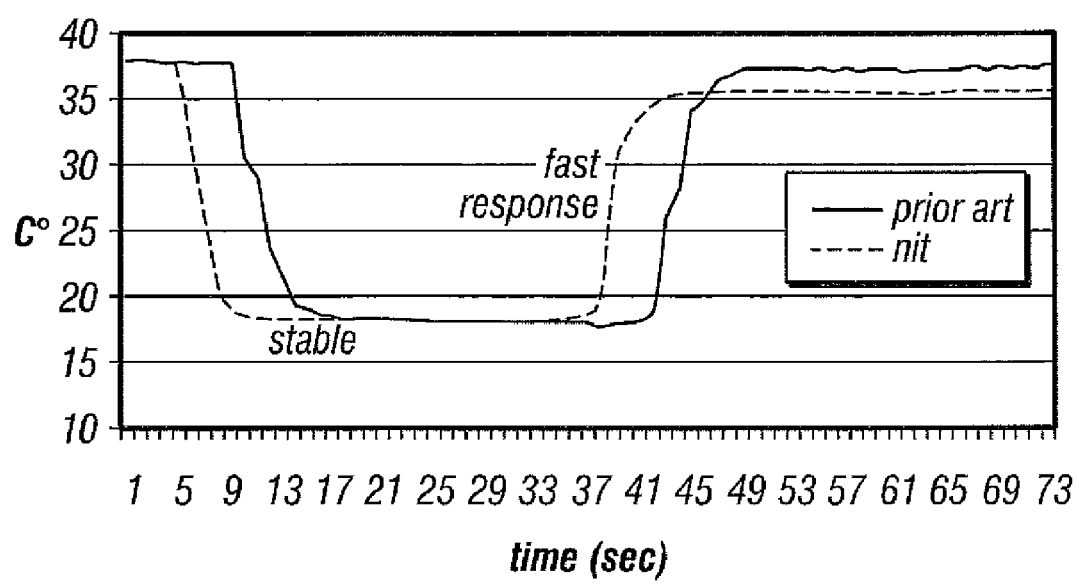

FIGS. 14A and 14B depict graphical representations of the response time for two elongated members 332 compared against the same reference probe-style temperature sensor commonly found in temperature sensing applications. FIG. 14A depicts a response time for detecting temperature using elongated member 332 having a cavity coated with gold and which may have a first percentage of IR reflectivity. FIG. 14B depicts a response time detecting temperature for elongated member 332 having a cavity coated with gold and which may have a second percentage of IR reflectivity. In this example, the second percentage of IR reflectivity is higher than the first percentage of IR reflectivity. The different percentages of IR reflectivity may be due to the material used to form elongated member 332, the material used to coat the cavity, etc. An advantage to having a lower percentage of IR reflectivity is that elongated member 332 does not absorb the IR energy emitted from the fluid and fluid window and further, elongated member 332 does not emit as much IR energy which can affect the temperature reading of the fluid. Thus, as compared to a reference temperature sensor generally used in the prior art, a non-intrusive thermal monitor such as NIT monitor 300 having elongated member 332 may have a faster response time. An advantage to having a faster response time may be the ability to detect temperature surges.

FIG. 14B further shows that a non-intrusive thermal monitor having elongated member 332 with a higher percentage of IR reflectivity may accurately sample temperature because elongated member 332 does not emit IR energy that could affect temperature sampling.

In some embodiments, a sample output for a calibration process involves running fluid through the temperature sensing device 100, 200 or 300 and comparing a stabilized fluid temperature signal from the temperature sensing device 100, 200 or 300 to thermocouple probe readings located upstream and downstream. Other calibration methods can include using a calibrated thermopile device to compare to other temperature means where the measurement is taken right at the point of the thermopile measurement location in the fluid path, or other measurement means such as thermistors, RTDs, etc. located up stream and/or downstream and/or at the same point in the flow path as the unit under calibration.

In some embodiments, NIT monitor 300 allows for easy calibration to ensure accurate sensing. Optics housing 360 may be installed into a calibration fluid housing, which may appear similar to fluid housing 305. The calibration housing may be a fluid housing 305 that has undergone lab testing to ensure a level of performance.

Since temperature readings for fluids running well over 100° C. may be required, water may not be used and instead calibration oil may be used, as it is generally undesirable to use some of the actual process chemicals for calibration. Since calibration oil is messy to handle, the calibration process is such that housing 360 may be removed from the calibration housing and installed into a fluid housing 305. Therefore, the chemical loop never needs to broken and optics housing 360 and all the other components can be removed from the calibration fluid housing or installed into fluid housing 305 with a negligible effect on the accuracy/performance. A single calibration housing which can handle multiple optics housings can also be designed and implemented.

Another benefit to being able to remove optics housing 360 from fluid housing 305 is for serviceability. If the electronics fail in the field or the unit needs to undergo recalibration (although recalibration is not a necessary process for a thermopile style device), optics housing 360 and electronics can simply be removed from the fluid housing 305 and a new optics housing (and electronics) can be installed without ever breaking into the fluid line.

Other calibration means can include a dry calibration process where a hot plate, a hot probe, or some other temperature controlled surface or object is positioned either in front of thermopile 130, at the end of elongated member 332, or down the center of fluid housing 305 and the signal produced by thermopile 130 may be compared to the known equivalent value for the process fluid temperature. With this information a temperature calibration curve, a look-up table with linear interpolation (or even extrapolation if necessary), or some other means can be introduced to complete the calibration.

In some embodiments, the calibration process can be run by setting the temperature recirculation loop to a specific temperature, waiting for everything to stabilize, taking all the reference temperature signals, and then stepping up by a small increment and repeating the process until calibration data is acquired across the entire temperature range (automated process). Another method involves running a continuous ramp of the fluid temperature or probe temperature and taking numerous calibration points across the range. Where the ramp rate is slow enough, the relative readings from each of the temperature measurements may be negligible.

Figure 15:
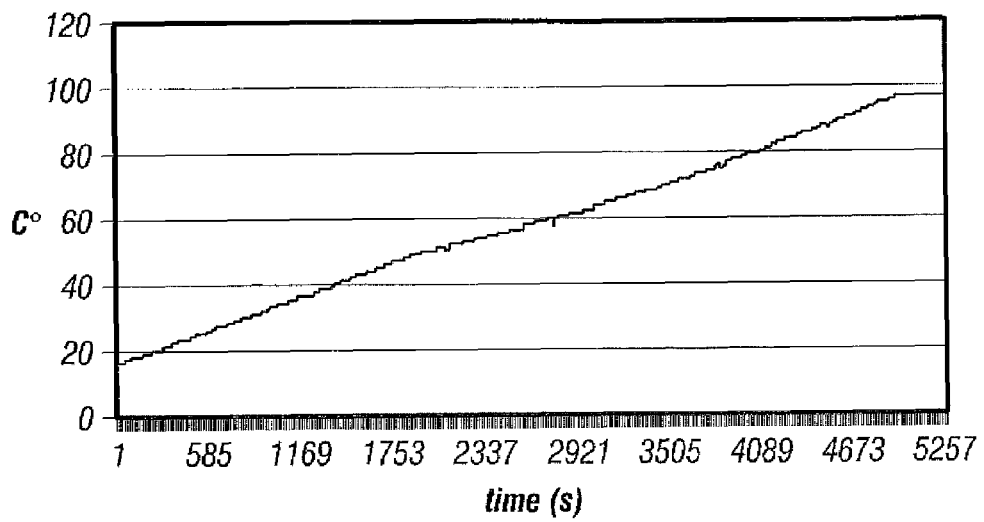
FIG. 15 depicts a graphical representation of one result of a calibration process for a non-intrusive thermal monitor.

As depicted in FIG. 15, in one example of a calibration curve, the temperature may be incremented up every 0.1° C. so that a stable reading can be taken. Once NIT monitor 100, 200 or 300 achieves a stable temperature for at least one minute, an average of a sample of readings is taken and used for the calibration of the device. In some embodiment, the calibration process is automated so once a reading is taken, the temperature of the heater/chiller recirculation bath is incremented up again. This process can be repeated until the entire target calibration range is covered.

Figure 16:
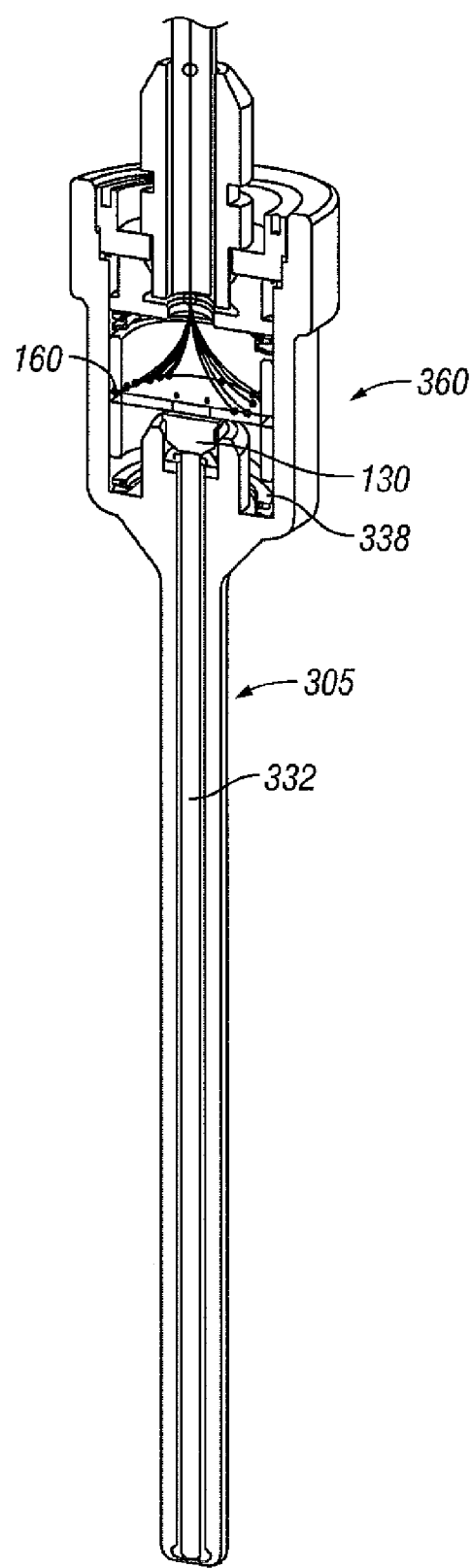
FIG. 16 depicts one embodiment of a thermal probe.

FIG. 16 depicts one embodiment of a probe style thermal sensing device. In some embodiments, an external or internal thread could be designed onto housing 305 or housing 360. In some embodiments, the threaded housing could include fluid window 325 for the end of elongated member 332 or thermopile face 810 without elongated member 332 providing that it does not require a secondary barrier and chemical permeation/positive fluid pressure is not an issue, etc or a separate window. In some embodiments, a diamond window 325 or 810 would be particularly useful for these types of applications where diamond is extremely inert and has a high transmission rate for IR.

In some embodiments, a probe style device could be configured with elongated member 332 such that some length of housing 360 is immersed in the fluid. In some embodiments, just fluid window 325 is immersed in or otherwise exposed to the fluid. Any electronics, including thermopile 130, could therefore be removed from the fluid to reduce any risk of chemical attack or extreme fluid temperatures.

Figure 17:
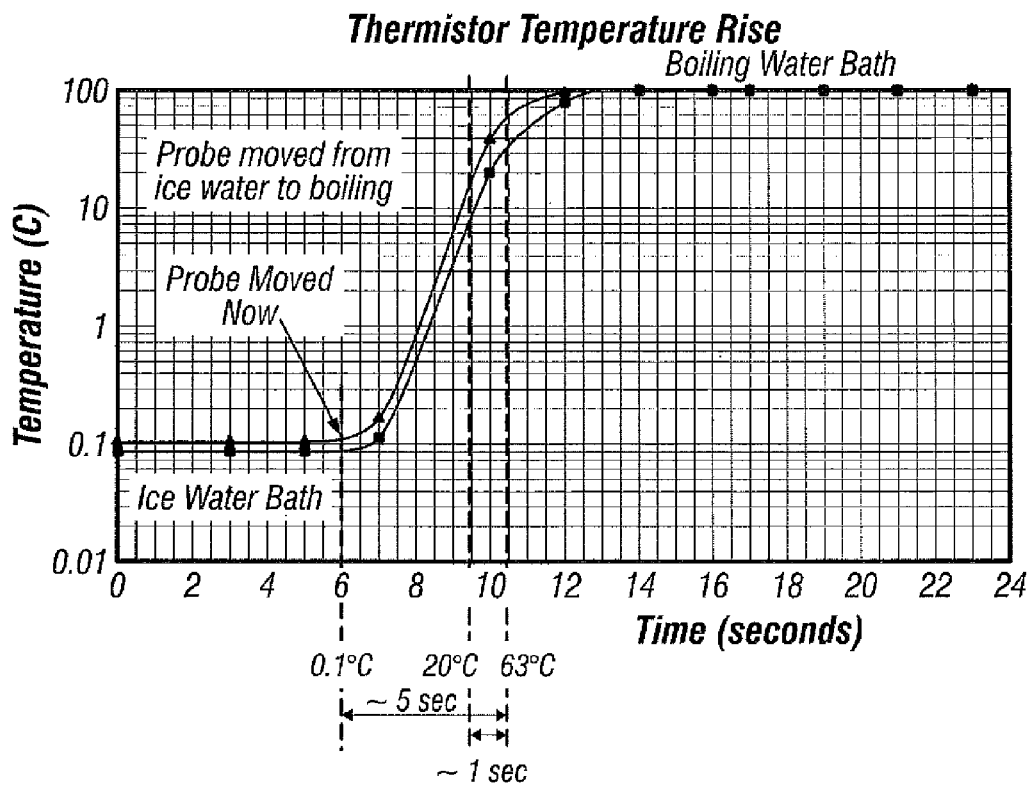
FIG. 17 depicts a graphical representation of the response time for one embodiment of a thermal probe compared to a thermistor.
Figure 18:
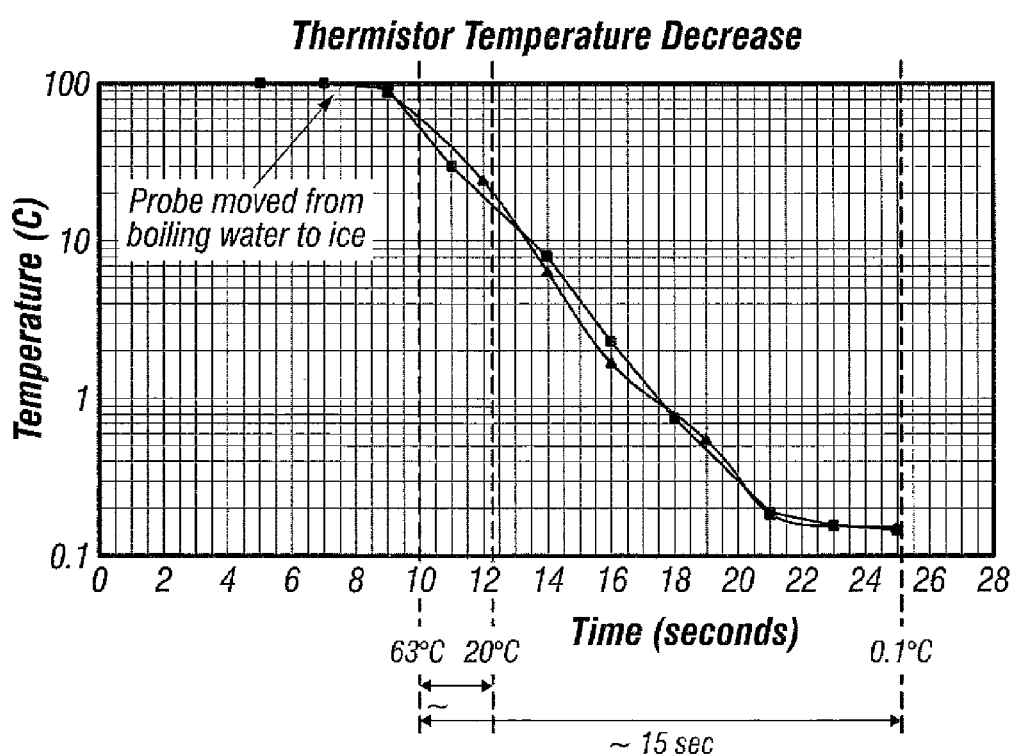
FIG. 18 depicts a graphical representation of the response time for one embodiment of a thermal probe compared to a thermistor.

FIGS. 17 and 18 depict graphical representations of response times for non-intrusive thermal monitors 100, 200 or 300 having thermopile sensors 130 in comparison with intrusive thermal monitors utilizing thermocouples. These two figures are plot diagrams representative of the response time of a temperature probe (thermistor) by Hart (Part # 5642), which has been used for highly sensitive temperature applications. The first plot diagram shows the thermistor response time for heating. The second plot diagram shows the thermistor response time for cooling, which is noticeably longer. As the above two plot diagrams demonstrate, even though the tested range is larger, the response time of a prior art probe-type temperature sensor is slower than that of a thermopile sensor 130. As described herein, the thermistor's thermal mass inevitably hinders the probe's response time which is even worse if required in aggressive chemical applications where the probe requires coating. An advantage to embodiments disclosed herein may be that the response for embodiments disclosed herein may be faster than prior art thermistors and sensor 130 and other electronics would be isolated from the fluid (as compared with a thermistor) and may therefore avoid corrosion that may require more frequent maintenance/replacement or contamination of the fluid being sampled.

In the foregoing specification, the invention has been described with reference to specific embodiments. However, one of ordinary skill in the art will appreciate that various modifications and changes can be made without departing from the spirit and scope of the invention disclosed herein. Accordingly, the specification and figures disclosed herein are to be regarded in an illustrative rather than a restrictive sense, and all such modifications are intended to be included within the scope of the invention.

What is claimed is:

1. A non-intrusive thermal (NIT) monitor, comprising:
a thermopile;
a fluid housing with a fluid window;
an elongated member positioned between the thermopile and the fluid window for transmitting or reflecting infrared signals corresponding to a temperature of a fluid in the fluid housing; and
one or more vent holes in communication with a cavity of the elongated member, wherein an end of the elongated member is adjacent to the fluid window.

2. The NIT monitor of claim 1, wherein at least a portion of the cavity of the elongated member is coated with gold.

3. The NIT monitor of claim 1, wherein the fluid window is a thin section of the fluid housing or made separate from the fluid housing.

4. The NIT monitor of claim 1, wherein the fluid window is positioned close to a central point of the fluid flow in the fluid housing.

5. The NIT monitor of claim 1, wherein the elongated member is an extended piece of the fluid housing or a part of an optics housing coupled to the fluid housing.

6. The NIT monitor of claim 1, further comprising an amplifier coupled to the thermopile for amplifying signals from the thermopile and providing the amplified signals to a remote conditioning board.

7. The NIT monitor of claim 1, wherein the thermopile and the elongated member are removable from the fluid housing where the fluid housing is plumbed into a fluid system.

8. The NIT monitor of claim 1, wherein the fluid housing has a cross-sectional profile that affects a temperature change.

9. The NIT monitor of claim 8, wherein the cross-sectional profile of the fluid housing restricts the fluid flow in front of the fluid window to promote an improved temperature sampling of the fluid and increase the speed with which the fluid window changes temperature.

10. The NIT monitor of claim 8, wherein the cross-sectional profile of the fluid housing induces turbulence in front of the fluid window to promote an improved temperature sampling of the fluid and increase the speed with which the fluid window changes temperature.

11. A system for non-intrusive thermal monitoring, comprising:
a non-intrusive thermal (NIT) monitor, comprising:
a thermopile;
a fluid housing with a fluid window;
an elongated member positioned between the thermopile and the fluid window for transmitting or reflecting infrared signals corresponding to a temperature of a fluid in the fluid housing; and
one or more vent holes in communication with a cavity of the elongated member, wherein an end of the elongated member is adjacent to the fluid window;
a main conditioning circuit board for processing the temperature measurements at a location separate from the NIT monitor; and
a cable connecting the NIT monitor and the main conditioning circuit board.

12. The system of claim 11, wherein interior of the elongated member is coated with gold.

13. The system of claim 11, wherein the fluid window is a thin section of the fluid housing or made separate from the fluid housing.

14. The system of claim 11, wherein the elongated member is an extended piece of the fluid housing or a part of an optics housing coupled to the fluid housing.

15. The system of claim 11, wherein the NIT monitor further comprises an amplifier coupled to the thermopile for amplifying signals from the thermopile and providing the amplified signals to the main conditioning circuit board via the cable.

16. The system of claim 11, wherein the optical and electrical components of the NIT monitor are removable from the fluid housing where the fluid housing is plumbed into a fluid system.

17. The system of claim 11, wherein the fluid housing has a cross-sectional profile that causes an increased velocity of the fluid to be focused directly up and in front of the fluid window, wherein the increased velocity of the fluid affects a temperature change of the fluid window.

18. The system of claim 17, wherein the cross-sectional profile of the fluid housing enables the fluid window to be positioned close to a central point of the fluid flow in the fluid housing.

19. A method for non-intrusive thermal (NIT) monitoring of a fluid, comprising:
receiving a fluid into a fluid passage in a fluid housing having a fluid window;
manipulating the fluid flow in front of the fluid window to improve temperature sampling;
non-intrusively taking temperature measurements of the fluid, the fluid window, or a combination of the fluid and the fluid window, wherein an end of an elongated member is positioned adjacent to the fluid window for transmitting or reflecting infrared signals corresponding to the temperature measurements;
providing a path for a gas or gases to move in and out of a cavity of the elongated member; and
transmitting the temperature measurements via the elongated member to a printed circuit board for processing the temperature measurements of the fluid at a location separate from the fluid housing.

20. The method of claim 19, wherein transmitting the temperature measurements of the fluid comprises amplifying signals from the infrared temperature sensor and providing the amplified signals to the printed circuit board via a cable.

21. The method of claim 20, further comprising using a calibration fluid housing to calibrate optical and electrical components of a NIT monitor and installing the calibrated optical and electrical components of the NIT monitor onto the fluid housing.

22. A method for isolating components of a non-intrusive thermal (NIT) monitor from chemicals, comprising:
forming a fluid window to serve as a first barrier between a fluid in a fluid housing and a cavity of an elongated member, wherein the fluid window is integral to the fluid housing;
providing a path for a gas or gases to move in and out of the cavity of the elongated member;
positioning a thermopile window on an external face of a thermopile; and
placing a seal mechanism on a face of the thermopile window to serve as a second barrier between the cavity of the elongated member and electronic components of and beyond the thermopile, wherein the elongated member is positioned between the fluid window and the thermopile window, wherein an end of the elongated member is adjacent to the fluid window, and wherein the elongated member is capable of transmitting or reflecting infrared signals to the thermopile and wherein the infrared signals correspond to a temperature of the fluid in the fluid housing.

23. The method of claim 22, wherein the elongated member is coated with or made of a material which is inert to chemicals contained in the fluid.

24. The method of claim 22, wherein the thermopile window is composed of a material which is inert to chemicals contained in the fluid.

25. The method of claim 22, wherein the elongated member is housed in an extended piece of the fluid housing and wherein the seal mechanism forms a fluid tight seal between the thermopile window and the fluid housing to prevent fluid passage between the thermopile window and the fluid housing.

26. The method of claim 22, wherein the elongated member is housed in an optics housing and wherein the seal mechanism forms a fluid tight seal between the thermopile window and the optics housing to prevent fluid passage between the thermopile window and the optics housing.

27. The method of claim 22, further comprising:
applying an axial load to the seal mechanism.

* * * * *